United States Patent [19]

Grout

[11] 4,392,889
[45] Jul. 12, 1983

[54] METHOD AND APPARATUS FOR RECOVERING SILVER AND PLASTIC FROM USED FILM

[75] Inventor: Kenneth M. Grout, Littleton, N.H.

[73] Assignee: Kenmartin Development, Inc., Littleton, N.H.

[21] Appl. No.: 275,981

[22] Filed: Jun. 22, 1981

[51] Int. Cl.³ .................... C22B 11/00; B29H 19/00; C08J 1/00

[52] U.S. Cl. .................. 75/97 A; 75/118 P; 266/112; 134/64 P; 134/104; 134/109; 134/9; 134/72

[58] Field of Search .............. 75/97 A, 118 P; 266/101, 112; 260/2.3; 134/104, 109, 64 P, 64 R

[56] References Cited

U.S. PATENT DOCUMENTS

| | | | |
|---|---|---|---|
| 1,669,394 | 5/1928 | Ellis | 75/118 P |
| 3,647,422 | 3/1972 | Wainer | 75/118 P |
| 3,678,843 | 7/1972 | Kohler | 134/122 P |
| 3,928,253 | 12/1975 | Thornton | 260/2.3 |
| 3,960,550 | 6/1976 | Dusenberry | 75/118 P |
| 4,078,916 | 3/1978 | Gerber | 260/2.3 |
| 4,230,404 | 10/1980 | Huss | 134/64 P |

*Primary Examiner*—Brian E. Hearn
*Attorney, Agent, or Firm*—Elmer J. Gorn; David A. Tucker

[57] ABSTRACT

A method and machine for recovering silver and polyester from exposed photographic X-ray film of the type having a polyester base coated with a sheath of polyvinyladine chloride and a photosensitive silver emulsion. Sheets of the film are fed through baths of hot caustic which successively remove the silver emulsion and deposit it as a sludge from which the silver is recovered and remove the polyvinyladine coating to permit the polyester to be recovered in a commercially acceptable pure form. Where the film sheets may include some acetate based film, the apparatus will distinguish between the polyester and acetate and discard the acetate bases as scrap, after the silver emulsion has been removed.

10 Claims, 5 Drawing Figures

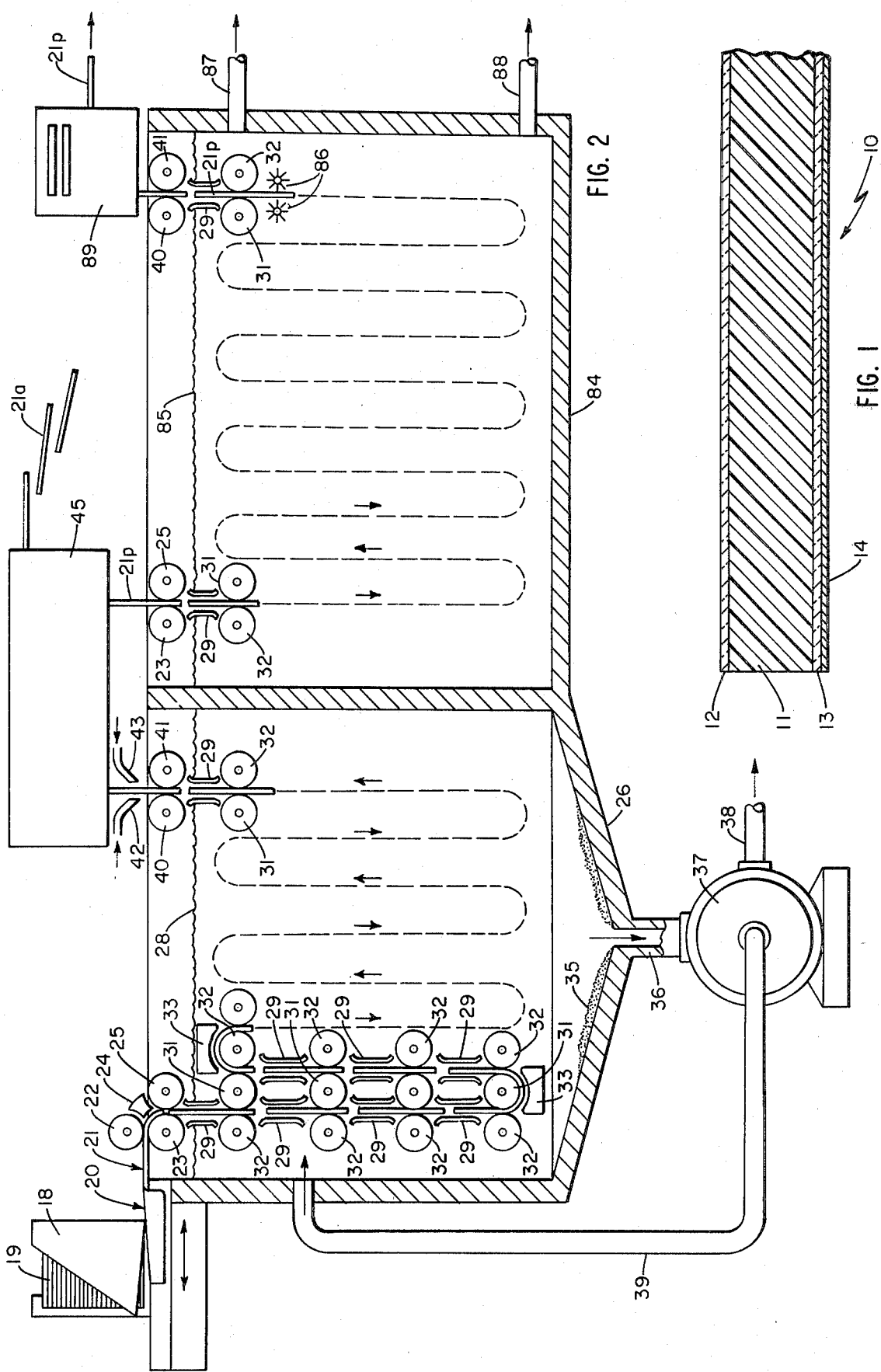

METHOD AND APPARATUS FOR RECOVERING SILVER AND PLASTIC FROM USED FILM

BACKGROUND OF THE INVENTION

Each year, industrial, medical and other procedures, which involve the use of X-ray and other photographic film, produce great quantities of used film containing many tons of photo grade silver and valuable polyester plastic material. Such used film is usually in the form of individual sheets or of elongated strips. At present several methods are used for recovering the silver, but no practical methods for recovering the polyester plastic material in an acceptable pure state exist. One prior art method for recovering the silver consists in burning the film and recovering the silver from the residue. The valuable polyester is, of course, destroyed. Another prior art method consists in chopping the film into small pieces and washing them in hot caustic or subjecting them to the action of an enzyme. This latter method recovers most of the silver. However, whenever one piece of film comes into contact with another piece of film there is a strong tendency for the pieces to stick together so that a high degree of agglomeration occurs. This not only inhibits the recovery of silver trapped between adhering surfaces but makes it virtually impossible to cleanse the individual pieces of polyester sufficiently to recover the polyester in a commercially pure state. Therefore, the polyester must be discarded, resulting in a significant economic loss.

SUMMARY OF THE INVENTION

The present invention comprises an apparatus and a method in which the film, usually in the form of sheets, is kept intact and is first passed through a bath preferably comprising a hot caustic solution. The apparatus is timed so that the film remains in the hot caustic solution until all of the silver has been precipitated as a layer on the bottom of the first stage of the apparatus and subsequently separated from the solution. Within a few seconds after substantially all of the silver has thus been precipitated, the film passes through a second stage of the apparatus, also containing a bath preferably of hot caustic. Where the body of the film is of polyester, it is coated with a sheath, preferably of polyvinyladine chloride, which provides the adhesive qualities required for the silver emulsion to bond to the film. The apparatus is so timed that the film, stripped of its silver, remains in the second stage until such adhesive sheath has been dissolved. This leaves the valuable polyester body of the film intact and clean. After the cleaned film emerges from the second stage, it is dried and is available for any of the various uses to which such material may be put.

In order to eliminate the problem of agglomeration of film as it exists in the prior art, throughout its travel through the baths, the film is carefully guided in such a path that no surface portion of the film is permitted to come into contact with any other film surface.

Some of the film in use today employs a base of acetate rather than polyester. Much of the film which is available for processing by the present invention is in the form of individual sheets, including a random collection of polyester based and acetate based sheets. The acetate is not sufficiently valuable to attempt to recover it from the used film. Therefore, a preferred form of the method and apparatus of the present invention is also designed to determine whether the base of the film, after it is stripped of its silver, is either acetate or polyester. One of the characteristic differences between the two materials is that, in the hot state, the acetate is much softer than the polyester. Thus, one form of the invention responds to the softness of the acetate to divert the acetate film out of the apparatus before it is able to enter the second stage of the apparatus. Thus, the comparative worthless acetate may be discarded as scrap, while the polyester based film is cleansed of its polyvinyladine chloride layer and recovered as described above.

Where the film to be processed is in the form of an elongated strip, the nature of the film base can readily be determined before the strip is fed into the apparatus, so that the polyester based strip can be subjected to the two stage treatment in the apparatus without the necessity of incorporating the softness testing mechanism in the apparatus itself.

BRIEF DESCRIPTION OF THE DRAWINGS

FIG. 1 is a longitudinal cross-section of a typical X-ray film,

FIG. 2 is a diagram of a preferred form of the apparatus in which the film of FIG. 1 is to be processed.

DETAILED DESCRIPTION OF PREFERRED EMBODIMENT

Figure 3:
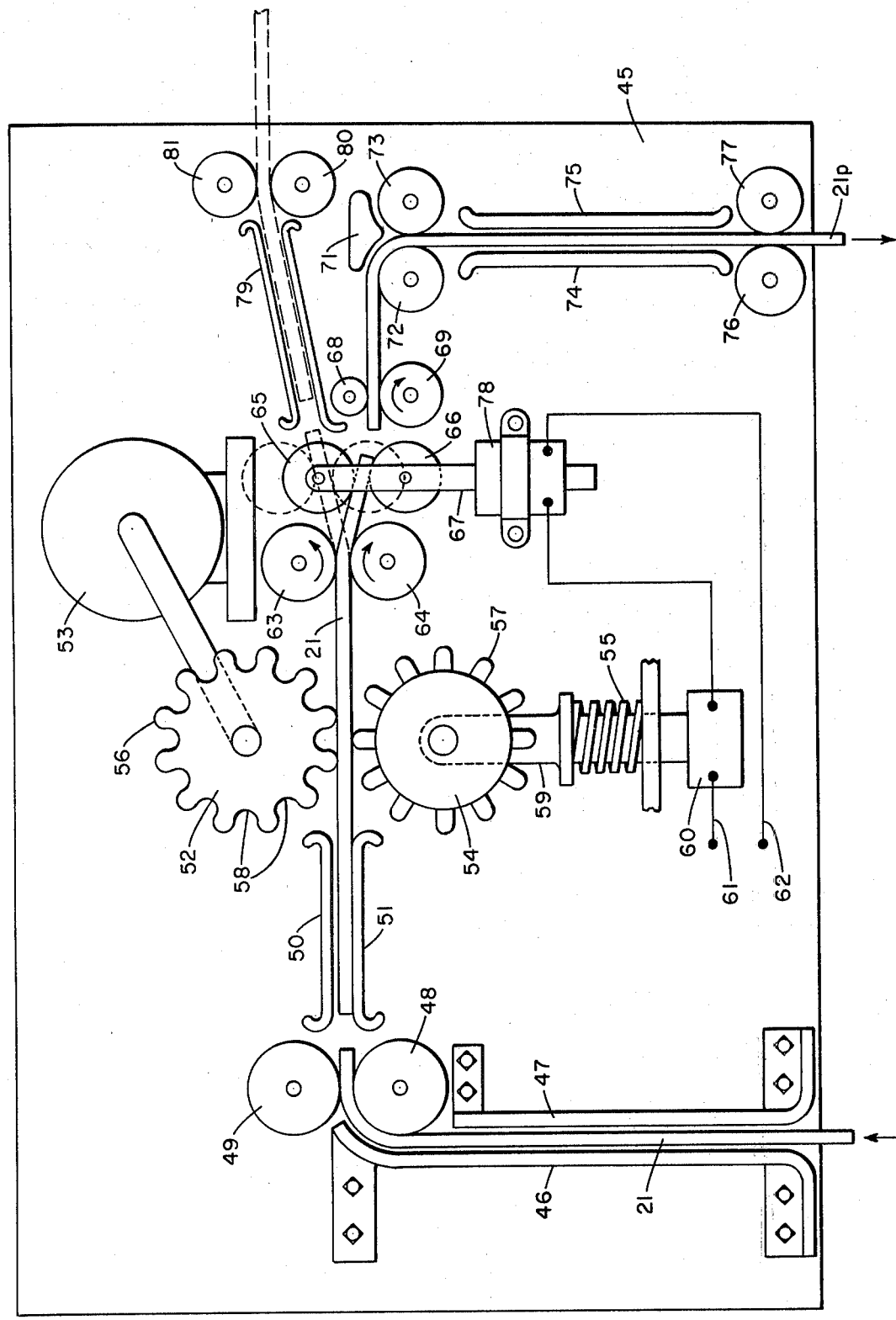
FIG. 3 is an enlarged view of that portion of the apparatus of FIG. 2 which distinguishes between a polyester film body and an acetate film body and which discards the acetate body.

FIG. 1 shows a typical X-ray film 10 having a body 11 of either polyester or acetate. In the case of polyester, body 11 is provided with surface layers 12 and 13 of polyvinyladine chloride. Such layers provide the adhesive qualities required for a silver emulsion to bond to the film. One of the layers is coated with a silver based X-ray sensitive emulsion 14. Typically, body 10 has a thickness of approximately 0.00755 inches and the total thickness of layer 12 plus layer 13 is approximately 0.00035 inches. Emulsion layer 14 is about 0.0001 inches thick. Thus, the total thickness of film 10 is about 0.008 inches.

The embodiment of the invention shown in FIG. 2 is especially adapted to process film in the form of individual sheets presented to it. For this purpose, the apparatus is provided with a container 18, in which is stacked a pile 19 of exposed X-ray films. The pile 19 may consist of a random collection of polyester and acetate based film sheets which may also be of varied sizes typically ranging from the smaller film size of about eight by ten inches, to the largest film size of about fourteen inches by seventeen inches. A standard type of reciprocating feeder mechanism 20 is provided, which in each of its forward thrusts, removes the bottom film sheet 21 from the stack 19 and pushes it into engagement between a pair of guiding idler rollers 22, 23 and past a corner deflector 24, into engagement with a drive roller 25 cooperating with idler roller 23 to pick up the film 21 and start it on its path through the processing apparatus. Feeder 20 is so timed as to feed a succession of film sheets 21 into the processing apparatus with a short spacing between successive sheets. As each film sheet 21 leaves drive roller 25, it is fed into a tank 26 comprising the first stage of the recovery apparatus. Tank 26 is filled with a bath 28 consisting of a hot solution of soda ash, or caustic soda, maintained preferably at a temperature of about 100° C. to 110° C. As each film sheet 21 enters the bath 28 it is guided by a pair of guide plates 29 into engagement with a drive roller 31 cooperating with an idler roller 32, which picks up the film sheet 21 and drives it through a succession of such guide plates 29, drive rollers 31 and idler rollers 32. Each film sheet is caused to follow a sinuous path through tank 26 by the use of direction reversing deflectors 33 mounted at the bottom of each vertical array of drive rollers 31 and at the top of each vertical array of idler rollers 32. It will be noted that each driving roller 31 is associated with a pair of idler rollers 32 disposed on opposite sides of the idler roller 31 so that each driving roller is adapted to drive the film sheets downwardly as they pass along one side of the driving roller and upwardly as they pass along the other side of the driving roller. The relationship between each driving roller and its associated idler roller will become more apparent as will be described below in connection with FIG. 4.

As each film sheet progresses through tank 26, the hot caustic bath 28 in tank 26 will attack the silver emulsion 14 and cause it to deposit as a sludge 35 on the bottom wall of tank 26, from which it is removed by a continuous flow of the soda ash solution of bath 28 through an exhaust pipe 36 into a centrifuge 37 which separates the silver from the solution and discharges it through discharge pipe 38 as the first valuable recovery product of the method and apparatus. The clarified soda ash solution is returned to bath 28 through the return pipe 39.

The removal of the silver emulsion will be completed before the hot caustic bath begins to have any substantial effect on layers 12 and 13. The temperature of the bath determines the speed of transport of the film through bath 26. At the preferred temperature of 100° C. to 110° C., the time to complete the removal of the emulsion and before the layers 12 and 13 start to dissolve is about 45 seconds. Therefore, the dimensions of the apparatus and the speed of travel of the film through tank 26 would be so selected that the time interval between the entry of film 21 into the hot caustic bath 28 and its emersion from said bath will be approximately 45 seconds. The temperature of the bath should be above 100° C. and the speed of transport of the film may be doubled for each 10° C. increase in temperature, thus halving said transport time.

Since there will be a substantial time interval between the complete removal of the emulsion and the beginning of any substantial dissolution of the protective layers, the exact time which film 21 stays in the bath is not critical as long as the adhesive layers have not yet begun to dissolve. The time of 45 seconds given is a safe interval for the conditions given above. Of course, it will be understood that, for any set of conditions it is well within the skill of that art to determine such a safe interval and to adjust the speed of travel of film 21 accordingly.

As the film 21 emerges from bath 28, it is picked up by a drive roller 40 and its cooperating idler roller 41 to propel the film into the next section of the apparatus. As film 21 leaves drive roller 41 it passes between a pair of rinse nozzles 42 and 43 which wash off any residual particles of the silver emulsion, which may still be clinging to the film, and drain such particles back into bath 28.

After film 21 has left drive roller 40, it enters a selection mechanism, generally designated as 45 in FIG. 2 and described in detail in FIG. 3. As shown in FIG. 3, as film 21 enters mechanism 45, it is guided by a pair of guide plates 46 and 47 into engagement by a drive roller 48 and idler roller 49, by which film 21 is driven, through a pair of guide plates 50 and 51, into engagement between a toothed roller 52, preferably driven by a separate motor 53 synchronized with the speed imparted to film 21 by drive roller 48. An externally toothed pressure roller 54 is biased toward drive roller 52 by a spring 55. The teeth 56 on drive roller 52 engage the top of film 21 and the teeth 57 on pressure roller 54 engage the bottom of film 21. If the body of film 21 is the desired polyester, it is sufficiently hard so that it withstands the pressure of the pressure roller and remains substantially straight as it travels between the rollers. If, however, the body of film 21 is the undesired acetate, it is so soft that the teeth 57 of roller 54 are able to push the film into the recesses 58 between the teeth 56 on roller 52. As a result roller 54 moves upwardly by the force of spring 55, carrying its support member 59 upward with it. The lower end of support member 59 cooperates with a switch 60 which closes a circuit between conductors 61 and 62 when roller 54 has moved upward in the presence of an acetate film 21.

In the case where the body of film 4 is the desired polyester, as the film emerges from the rollers 52 and 54 it passes between a pair of guide rollers 63 and 64 which guide the film into the space between two rollers 65 and 66 mounted on a movable carrier arm 67 normally held in its lowered position in which the rollers 65 and 66 are positioned as shown by the solid line stage of FIG. 3. In that position rollers 65 and 66 direct the film into a path extending through two guide rollers 68 and 69. These guide rollers direct the film along a salvage path extending between a corner deflector 71, a drive roller 72, a cooperating idler roller 73, a pair of guide plates 74 and 75, and a drive roller 76 and idler roller 77 from which it emerges from the selection mechanism as a valuable polyester item designated as 21p in the drawings.

In the case where the body of film 21 is the undesired acetate, the closure of switch 60 will complete an energization circuit through solenoid 78 which will raise the carrier arm 67 which will raise the guide rollers 65 and 66 into their dotted line position as shown in FIG. 3. In that position rollers 65 and 66 will direct the film through deflecting guide member 79 into a rejection path through drive roller 80 and idler roller 81, from which it emerges from selection mechanism 45 as scrap acetate designated as 21a in FIG. 2 and FIG. 3.

The polyester film material 21p emerging from the selection mechanism 45 will, as shown in FIG. 2, pass into a second tank 84 comprising the second stage of the recovery apparatus. Tank 84 is also filled with a bath 85 of hot caustic. Film 21p is driven through bath 85 along a sinuous path by a mechanism substantially identical with the driving mechanism in tank 26, including members 23, 25, 29, 31, 32, 40 and 41 together with the various other elements associated therewith and described in detail above. However, the length of the path of the film 21p in tank 84 is designed so that within the time in which film 21p remains immersed in bath 85, the adhesive surface layers 12 and 13 will have been completely removed from the body 11 of the film 21p by the action of the hot caustic bath 85. In the case of the film as specifically described in FIG. 1, the time of passage of film 21p through bath 85 will be about 75 seconds, making the total time of travel of film 21 through the recovery apparatus two minutes. In order to insure that the polyester body 11 of film 21p is completely clean as it emerges from the bath 85, it passes between a pair of rotating scrubbing brushes 86.

Preferably the effectiveness of the hot caustic solution of bath 85 is maintained by continually pumping the solution out through an exhaust pipe 87, purging it of its contaminants, in any well known manner, and returning the cleansed caustic solution to bath 85 through inlet pipe 88.

As the film 21p emerges from rollers 40 and 41, it is passed through a drying chamber 89 from which it emerges clean and dry and ready to be put to any of the uses for which its polyester material is intended.

In order to insure that each sheet of film is positively driven throughout its travel through the apparatus, the distance between adjacent drive rollers is designed so that the film is picked up and driven by each drive roller before it is released by the preceding roller. Since the length of the smallest standard X-ray film size is about ten inches, if the distance between successive drive rollers is somewhat less than ten inches, the desired positive drive will be achieved. In addition, it will be noted that in passing from one drive roller to the next, each sheet of film is guided so that its forward end will not wander from a path leading directly to the next guide roller.

Figure 4:
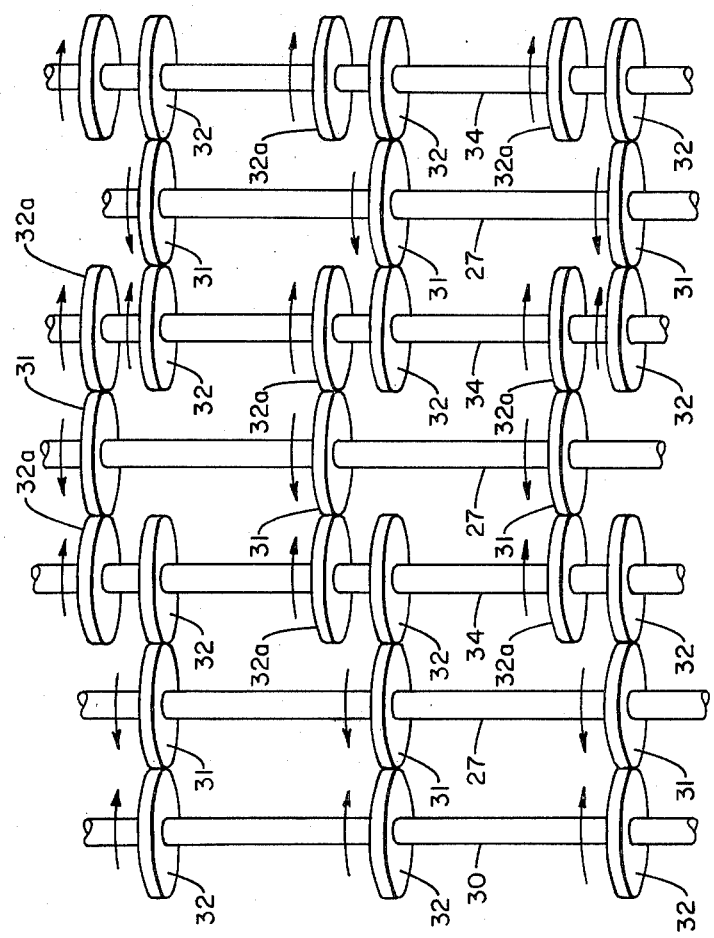
FIG. 4 is an enlarged, partial view of the arrangement of the driving and idler rollers for driving film through the processing stages of the apparatus of FIG. 2.

FIG. 4 is an enlarged partial view of the arrangement of the driving rollers 31 and idler rollers 32 in tanks 26 and 84 as viewed from above. At each driving position, at least three driving rollers 31 are mounted on a driving shaft 27. There are three idler rollers 32 at the left hand side of the drive rollers 31 mounted on an idler shaft 30 and six idler rollers 32 and 32a on the right hand side of drive roller 32 mounted on an idler shaft 34. The three idler rollers 32 cooperate with the three drive rollers 31, mounted on shaft 27. Since the view in FIG. 2 is an end view of the driver and idler roller assembly only the end drive roller 31 and the end idler roller 32 can be seen in FIG. 2. Preferably idler rollers 32 are made of a resilient urethane material so as to allow each film sheet to pass between and be properly engaged between the drive and idler rollers 31 and 32.

As indicated in FIG. 4, in the first, or left hand, end driving assembly, the drive shaft 27 is rotated in a counterclockwise direction. Thus, when the film sheet enters from the top of the apparatus it is engaged between each drive roller 31 and the idler rollers 32 mounted on idler shaft 30 on the left-hand side of driving shaft 32 to propel the film downwardly through the bath 28 of FIG. 1. When the direction of travel of the film has been reversed by deflector 33, it is engaged between each drive roller 31 and the idler rollers 32 on the idler shaft 34 on opposite, or right-hand, side of drive shaft 27. Due to the shifting of the film from one side to the other of the drive rollers, such rollers will now propel the film in an upward direction. When the direction of travel of the film has been reversed by deflector 33, the film again enters from the top of the next set of drive and idler rollers. For a purpose to be explained below, the drive rollers 31 are displayed transversely a short distance from the drive rollers 31 on the left hand drive shaft 27. Therefore an additional set of three idler rollers 32a are mounted on idler shaft 34 displaced from idler rollers 32 by the same distance so as to be in line with the displaced drive rollers 31 located on their right hand side. Idler rollers 32a are also preferably made of resilient materials so that the film entering from the top of the apparatus will be driven through the same type of path as described for the first set of drive and idler rollers. A third, or right-hand, set of drive and idler rollers. A third, or right-hand, set of drive and idler rollers is shown in FIG. 4 which operates exactly as described for the first two sets of drive and idler rollers. As many additional sets are provided as required.

The showing of FIG. 4 is used to illustrate another feature of the invention which not only is adapted to handle all standard sizes of X-ray film but also insures that all surfaces of each film sheet is exposed substantially equally to a maximum of the action of the baths 28 and 85. It will be noted that the thickness of each drive roller 31 forms a relatively small part of the total distance spanned by all three drive rollers on each drive shaft 27. It is desirable that each film sheet be engaged by at least two of these drive rollers so as to import the proper direction of movement to the film. Since the narrowest of the standard X-ray film sizes is about eight inches, if the spacing between adjacent rollers is about 3¾ inches, making the span across all three rollers about 7½ inches, the eight inch film size will be engaged and driven by at least two rollers. Of course, the largest standard X-ray film having a width of about fourteen inches will also be engaged by all three drive rollers. It is to be understood that each drive shaft may be equipped with more than three drive rollers. Where four such rollers are present, the total span across the rollers is to be 11¼ inches and thus the largest size of film will be engaged and driven by four drive rollers in the example given.

As above noted, in FIG. 4 each successive set of drive rollers, with its associated set of idler rollers, is transversely displaced a short distance from the adjacent set. Therefore, as each film sheet leaves one of these sets and enters the next one, the surface of the film sheet which is engaged by the rollers will be different from the surface engaged by the previous set. Thus, any difference in degree, to which various parts of the film surface are subjected to the action of the hot caustic bath, is substantially eliminated.

Figure 5:
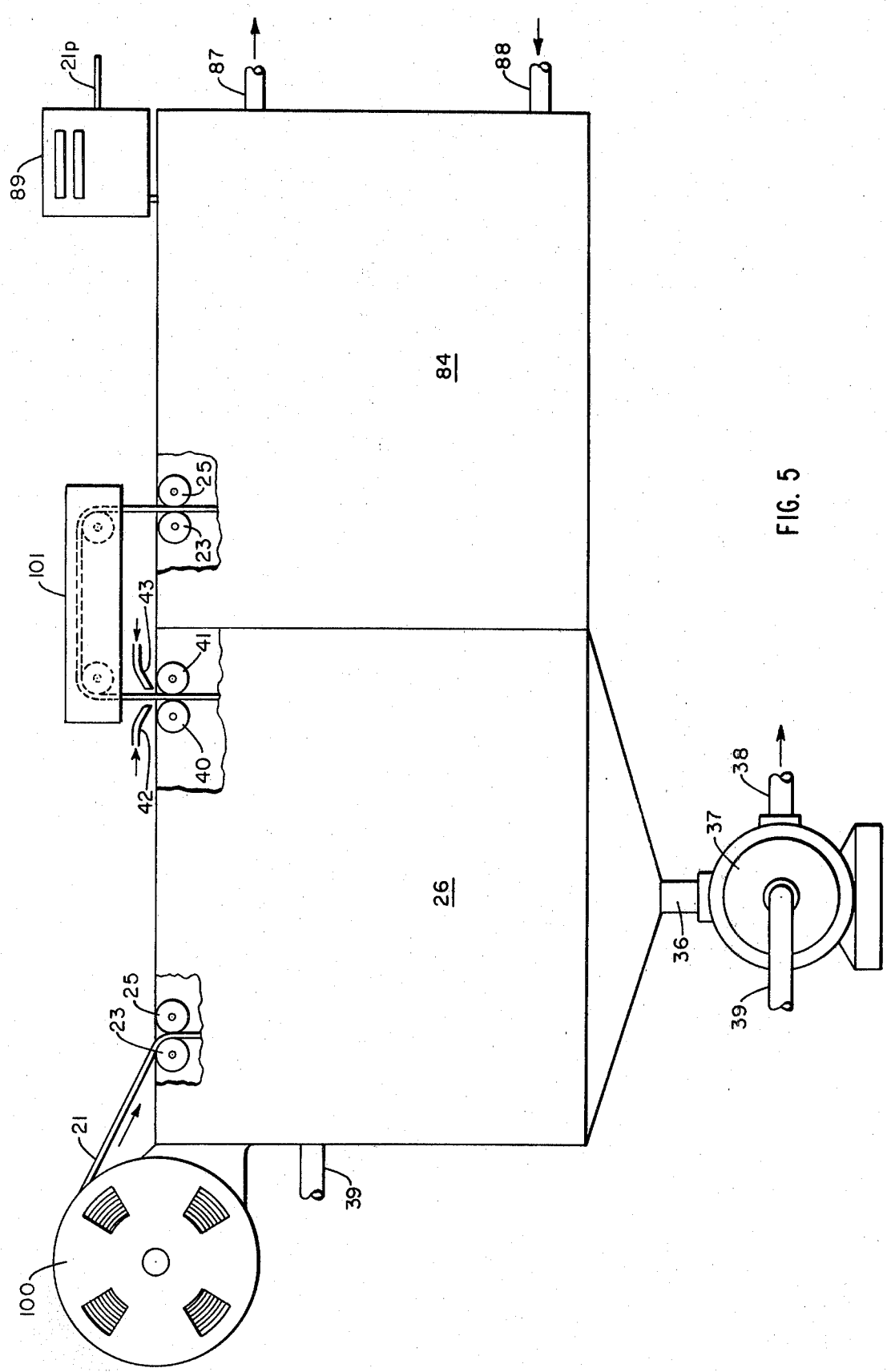
FIG. 5 is a diagram of a modified form of the invention adapted to process a continuous, elongated film.

In the embodiment shown in FIG. 5, the film to be subjected to the recovery process is presented to the apparatus in a continuous, elongated strip form which may conveniently be mounted in a supply reel from which a film 21 is fed into processing tanks 26 and 84. The internal structure of these tanks may be identical with the structures described in FIGS. 2 and 4. Therefore, similar reference numbers are used in FIG. 5 to designate elements substantially identical with elements in FIGS. 2 and 4. Thus it will be seen that film 21 enters tank 26 by way of drive roller 25 and idler roller 23 and emerges from tank 26 by way of drive roller 40 and idler roller 41. It is a relatively simple matter to determine whether or not the film in supply reel has a polyester or an acetate base so that the embodiment of FIG. 5 does not require the use of selection mechanism 45 described in detail in FIG. 3. All that is required is a simple guide mechanism 101 for guiding the film strip 21 back into tank 84 through drive roller 25 and idler roller 23 after the film 21 has been rinsed by nozzles 42 and 43. As in the case of FIG. 2, the film which emerges from tank 84 is dried in the drying chamber 89 from which it emerges as a valuable polyester strip 21p.

It is to be understood that the composition of the treatment baths in tanks 26 and 84 and the conditions specified for such baths will be the same as described for FIG. 2. Since the film in FIG. 5 is in continuous strip form, the driving and guiding requirements are less rigid than in the case of separate film sheets. Therefore, it may be possible to simplify the driving and guiding structure of FIG. 2 as, for example, by making the spacing between successive drive rollers in FIG. 5 substantially greater than the spacing in FIG. 2 and thus reducing the required number of such rollers.

Where it is determined that the film base is acetate, the process is terminated when the film emerges from tank 26 and the emergent film discarded as scrap.

It is to be noted that one of the important features of the method and apparatus of this invention is that, throughout the treatment of the film in the baths, all surfaces of the film are carefully held from coming into contact with the surface of any other part of the film. It has been found that, upon any such contact, the contacting surfaces tend to adhere tenaciously to each other making it extremely difficult to recover the silver trapped between such adhering surfaces and even more difficult to recover the polyester base from the resulting agglomeration.

It is to be understood that, while the above represents the presently preferred embodiments of the invention, various changes may be made of their details within the scope of the invention as defined by the appended claims. For example, an enzyme process could also be used but it would be much slower than the preferred hot caustic solution. Other materials which may be found to remove the silver emulsion and the adhesive surface thus could be used instead of the hot caustic solution. Instead of using a centrifuge to separate the silver from the bath, a settling tank might be substituted. Other variations and changes may suggest themselves to those skilled in the art.

What is claimed is:

1. The method of recovering silver and polyester from photographic film of the type comprising a polyester base having a surface coating which provides adhesion for a silver emulsion layer on said surface coating, said method comprising:
    (a) passing the film through a bath of a material which will attack the silver emulsion layer until it separates from the film and deposits as a sludge in said bath;
    (b) removing said sludge from said bath;
    (c) separating the solid silver containing particles of said sludge from the liquid portion of said sludge;
    (d) passing the film, cleansed of said silver emulsion, through a second bath of a material which will attack and remove said surface coating from said polyester base;
    (e) restraining said film from having any portion of its surface coming into contact with any other film surface throughout its travel through said baths, whereby any agglomeration of film is avoided; and
    (f) removing said cleansed polyester from said second bath;
    (g) whereby said silver containing particles and said cleansed polyester constitute the desired valuable recovery products.

2. The method of claim 1 in which each of said baths comprises a hot caustic solution.

3. The method of claim 2 in which the temperature of each bath is above 100° C., and in which the speed of transport of said film through said first bath completes said transport in about 45 seconds at a temperature range of about 100° C. to 110° C., and in which said speed is doubled for each increase of 10° C. above said range.

4. The method of claim 1 in which the film is in the form of separate sheets, some of which may have a polyester base and others of which have an acetate base, and in which, after each film sheet has been cleansed of its silver emulsion, the polyester based sheets are separated from the acetate based sheets in response to the difference in the softness of polyester and acetate, and only the polyester based sheets are passed through said second bath while said acetate based sheets are discarded.

5. An apparatus for recovering silver and polyester from a photographic film of the type having a polyester base having a surface coating which provides adhesion for a silver emulsion layer on said surface coating, comprising:
    (a) a bath of a material which will attack and remove the silver emulsion layer from said film,
    (b) means for feeding said film into said bath;
    (c) means for guiding said film through said bath along a path of sufficient length so that the time of travel through said bath is sufficient to cause said bath to substantially completely remove said emulsion from said film and deposit it as a sludge in said tank;
    (d) means for removing said sludge from said tank and for separating the solid silver containing particles of said sludge from its liquid portion, whereby said separated solid particles may be used as a valuable recovery product;
    (e) a second bath of a material which will attack and remove said surface coating from said polyester base;
    (f) means for feeding said film, cleansed of said silver emulsion, into said second bath;
    (g) means for guiding said film through said second bath along a path of sufficient length to cause said bath to substantially completely remove said surface coating from said polyester base;
    (h) means for leading said polyester base, cleansed of said surface coating, out of said second bath as a second valuable recovery product;
    (i) each of said guiding means being constructed and adapted to restrain said film from coming into contact with any other film surface, whereby agglomeration of said film is prevented.

6. An apparatus as in claim 5, which is adapted to receive said film in the form of separate sheets, one of which may have a polyester base and others of which may have an acetate base, also comprising:
    (a) a selection mechanism interposed in the path of travel of said film from said first bath to said second bath, said selection mechanism including
    (b) means, responsive to the difference in the softness between the polyester based film and the acetate based film, for deflecting the acetate based film sheets into a rejection path and for directing the polyester based film sheets into the path leading into said second bath.

7. An apparatus as in claim 6 in which said means responsive to the difference in the softness between the film base comprises:
    (a) means having a projection biased to press against the surface of each film sheet passing through said selection mechanism, and to move, under the influence of its bias, by an amount corresponding to the softness of said film; and (b) means responsive to substantial degree of motion of said projection against said film, for deflecting the softer acetate based film into said rejection path, while being responsive to a lack of such substantial motion to direct the polyester based film into the path into said second bath.

8. An apparatus as in claim 6 in which said means responsive to the difference in the softness of the film bases comprises:
   (a) a pair of toothed rollers biased toward each other, the spacing between the teeth of each roller being large enough to permit teeth of the other roller to enter freely into such spacing;
   (b) means for guiding each film sheet between said rollers;
   (c) the hardness of the polyester based film being sufficient to overcome said bias and prevent the meshing of the teeth of one roller with those of the other roller, the softness of the acetate based film being sufficient to permit said teeth to move said teeth into such meshing engagement, and
   (d) means, responsive to a substantial degree of motion of said rollers toward each other upon such engagement, for deflecting the softer acetate based film into said rejection path, while being responsive to a lack of such substantial motion to direct the polyester based film into the path into said second bath.

9. An apparatus as in claim 5, which is adapted to receive said film in the form of separate sheets, which may be of various sizes, and in which several feeding and guiding means for said film include:
   (a) a series of drive rollers for imparting the desired movement of the film sheets through said apparatus, and in which each of drive rollers in each of said bath comprises:
   (b) an assembly of at least three narrow rolls mounted on a roller drive shaft, said apparatus being adapted to present each of said film sheets transversely across said assembly;
   (c) the spacing between each adjacent roller being somewhat less than half of the width of the narrowest of the film sheets which may be fed into said apparatus;
   (d) whereby each film sheet is simultaneously engaged by at least two of said rolls in the passage of said sheet across said drive roller assembly.

10. An apparatus as in claim 9 in which:
    (a) said roller assemblies are arranged in a plurality of adjacent vertical sets of said assemblies for driving said film sheets in a series of descending and ascending vertical paths through said baths;
    (b) the position of the rolls in each set being transversely displaced with respect to the rolls in an adjacent set;
    (c) whereby each film sheet is engaged by said rolls at different positions across its width in its transport through said baths, and all the surfaces of said film sheets are given substantially equal treatment by said baths.

* * * * *